Aug. 30, 1938.  R. E. KELLER  2,128,485
AUTOMATIC TRANSMISSION
Filed Aug. 25, 1933  2 Sheets-Sheet 1
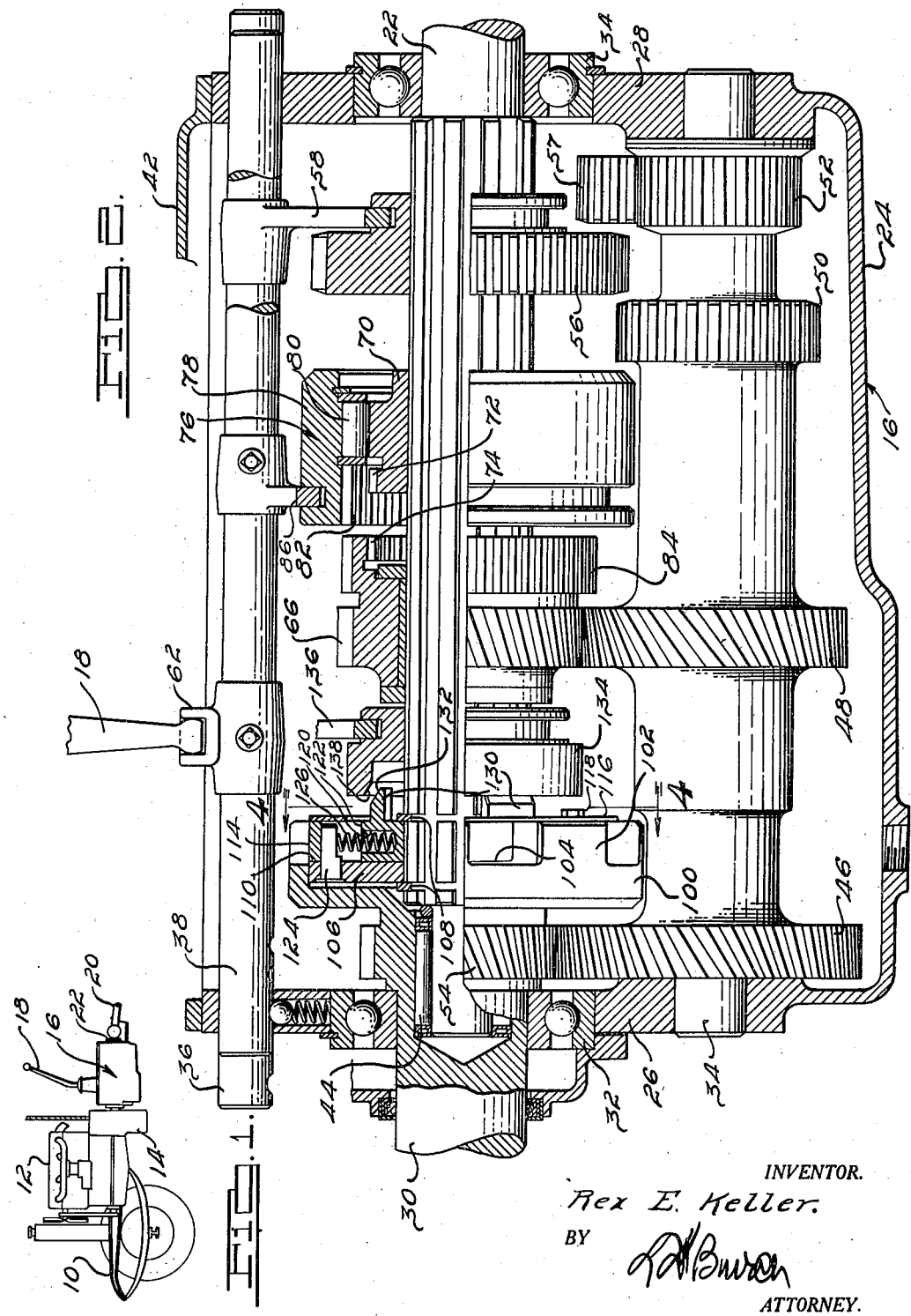
INVENTOR.
Rex E. Keller.
BY
ATTORNEY.

Aug. 30, 1938.  R. E. KELLER  2,128,485
AUTOMATIC TRANSMISSION
Filed Aug. 25, 1933   2 Sheets-Sheet 2
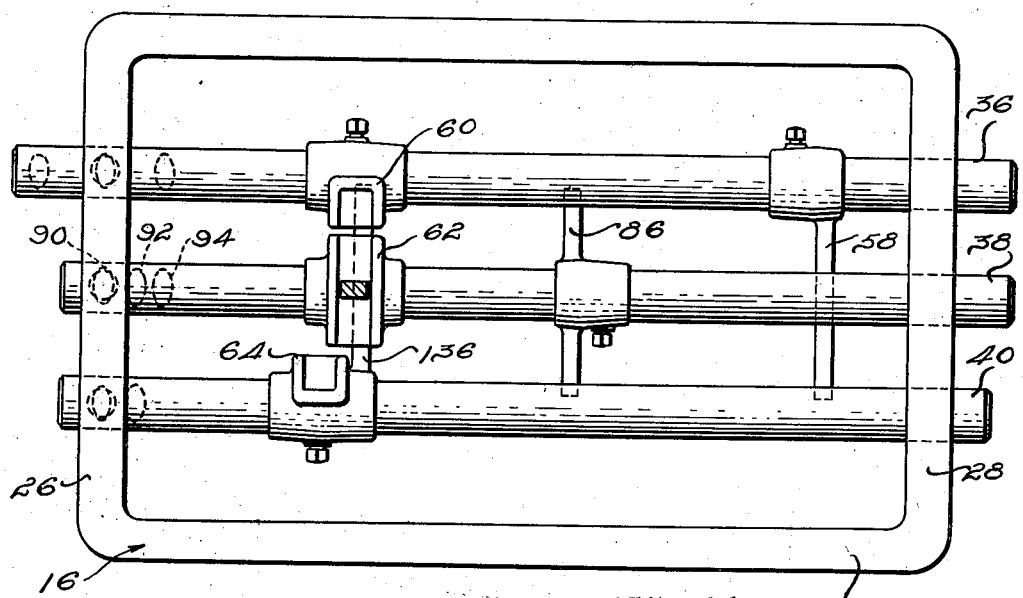
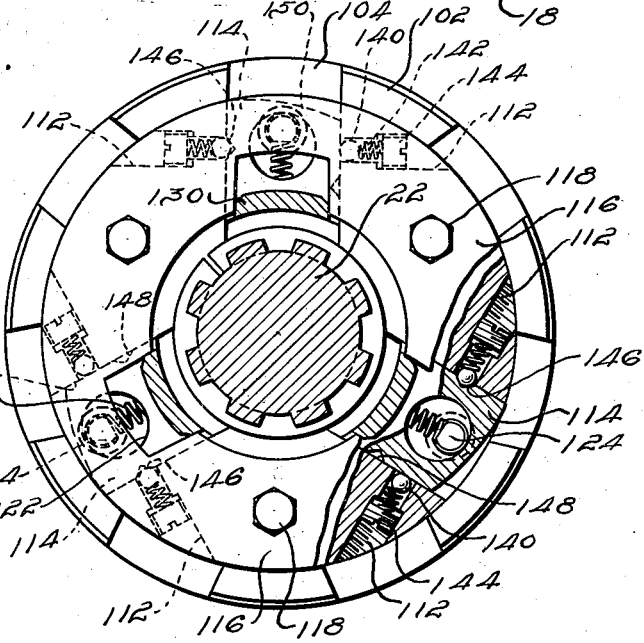
INVENTOR.
Rex E. Keller.
BY
ATTORNEY.

Patented Aug. 30, 1938

2,128,485

UNITED STATES PATENT OFFICE 2,128,485

AUTOMATIC TRANSMISSION

Rex E. Keller, Beverly Hills, Calif.

Application August 25, 1933, Serial No. 686,683

4 Claims. (Cl. 74—336)

My invention relates to automatic transmissions or speed changing mechanism and particularly to automatic transmissions especially adapted for use in automotive vehicles.

For purposes of illustration I have disclosed my invention in connection with a three forward speed transmission in which means are provided for effecting an automatic change in the driving speed ratio between intermediate and high gear ratio responsive to variations in the speed of rotation of the driven shaft above and below critical speeds, together with means for manually effecting a change in the driving speed ratio from an automatic high gear ratio to an intermediate gear ratio without regard to the speed of rotation of the driven shaft.

An object of my invention, therefore, is to provide an automatic transmission in which the normal changes in the driving ratio between intermediate and high, and between high and intermediate, are automatically effected responsive to variations in the speed of rotation of the driven shaft above and below critical speeds and with means for manually effecting a forced change in the driving speed ratio from a high to an intermediate gear ratio without regard to the speed of rotation of the driven shaft.

Another object of my invention is to provide means for locking out the automatic speed changing mechanism for holding the transmission in an intermediate gear ratio.

Other objects and advantages will appear from the following description with reference to the accompanying drawings of which there are two (2) sheets, and in which:

Fig. 1 is a view illustrating my automatic transmission incorporated in an automotive vehicle;

Fig. 2 is a side elevational view partly in section, of the internal construction of my automatic transmission;

Fig. 3 is a top plan view of the gear shifting mechanism;

Fig. 4 is a view taken generally on the line 4—4 of Fig. 2 looking in the direction of the arrows and illustrating the details of the automatic speed changing mechanism; and Fig. 5 is a diagrammatic view of the handle positions of the shift lever.

Referring to Fig. 1 there is shown an automotive vehicle having a main frame 10, an engine 12 mounted thereon, a housing enclosed clutch mechanism 14 supported rearwardly of the engine 10, a transmission indicated generally at 16, a manipulative lever 18 for shifting the transmission gears, and a propeller shaft 20 connected thru a universal joint mechanism to a driven shaft 22 of the transmission.

The transmission 16 in general comprises a casing 24 provided with front and rear walls 26 and 28 providing support for a driving shaft 30, and a driven shaft 22, suitably journaled in bearings 32 and 34 supported in the end walls 26 and 28 respectively, a countershaft 34 journaled in the walls 26 and 28 and secured against rotation by any suitable means, a plurality of yoke rods 36, 38 and 40 slidably secured in the end walls 26 and 28 and a cover 42 providing a closure for the casing 24 and a support for the shift lever 18. The driven shaft 22 is splined throughout its length within the casing 24 and is reduced at its forward end and journaled in roller bearing 44 disposed in a counterbored end of the driving shaft 30. A cluster of gears 46, 48, 50 and 52 are mounted to rotate as a unit on the countershaft 34. A portion of the driving shaft 30 within the casing 24 may be formed to provide a helical gear 54 which is adapted constantly to intermesh with helical gear 46 on the countershaft for the purpose of rotating the cluster of gears with the engine. The driving shaft 30 is suitably connected through the housing enclosed clutch mechanism 14 to the engine 12.

A gear 56 is slidably splined to the driven shaft 22 and is adapted to be moved into engagement with gear 50 on the countershaft for the purpose of providing a low gear driving connection between the driving and driven shafts, and is further adapted to be moved into engagement with an idler gear 57 mounted upon a shaft (not shown) and meshing with gear 52 on the countershaft for the purpose of providing a reverse gear driving connection between the driving and driven shafts. A fork 58 carried by a yoke rod 36 is provided for shifting the gear 56.

The yoke rods 36, 38 and 40 are provided with gates 60, 62 and 64 respectively which are adapted to be engaged by the end of the gear shift lever for the purpose of manually effecting a change in the driving ratio between the driving and the driven shafts. A helical gear 66 suitably secured against lateral displacement is rotatably mounted on the driven shaft 22 and in constant mesh with a helical gear 48 on the countershaft. A hub 70 slidably splined on the driven shaft, is provided with a set of external radial teeth 72, adapted to mesh with internal radial teeth 74 provided on the gear 66 for the purpose of providing a two-way drive between the gear 66 and the driven shaft 22. The hub 70 comprises the driven member of an overrunning clutch of well known construction and indicated generally at 76, which includes a driving member or shell 78 and a series of rollers 80 disposed between the driving and driven members.

The overrunning clutch is adapted to drive the driven shaft 22 thru the hub member 70 but permits the driven shaft 22 to overrun the driving member 78. The driving member 78 is provided with an internal radial set of teeth 82 adapted to mesh with an external radial set of teeth 84 provided on the gear 66. A fork 86 carried by the yoke rod 38 is provided for shifting the overrunning clutch 76 to provide either a one-way drive or a two-way drive between the intermediate speed gear 66 and the driven shaft 22.

When the overrunning clutch 76 is shifted so that only the teeth 82 and 84 are in engagement, a one-way drive will be provided between the gear 66 and the driven shaft 22 which will be driven from the driving shaft thru the intermediary of helical gears 54, 46, 48, 66 and overrunning clutch members 78 and 70, the latter of which is slidably splined to the driven shaft 22. When the overrunning clutch 76 is shifted so that the teeth 72 and 74 are in engagement, a two-way or positive drive will be provided between the intermediate speed gear 66 and the driven shaft 22, and the overrunning clutch 76 will be locked out. The yoke rod 38 is provided with a series of notches 90, 92 and 94 corresponding respectively with the "neutral", "free wheeling", and "positive" drive positions of the overrunning clutch 76.

Between the gear 54 on the driving shaft and the intermediate speed gear 66 on the driven shaft, there is provided an automatic speed changing mechanism having a driving member on the driving shaft and a driven member on an adjacent portion of the driven shaft for effecting an automatic change in the driving ratio between the shafts responsive to variations of the speed of rotation of the driven shaft 22 above and below predetermined speeds. The driving member of the automatic speed changing mechanism comprises a drum-shaped shell 100, having a plurality of laterally projecting fingers 102 defining a series of equidistantly spaced slots 104 in the periphery thereof. The fingers 102 afford a shoulder or stop with which a bolt 114 carried by the clutch core 106 is engageable for connecting said clutch core and drum.

The driven member of the automatic speed changing mechanism comprises a core 106 splined to the forward end of the driven shaft 22 and secured thereon against lateral displacement by snap rings 108. The driven member or core 106 is provided with a plurality of radially extending slots or grooves 110 in one face thereof, a pair of oppositely disposed bores 112 for each of the slots 110 and at right angles to the axis thereof, and a bolt or dog 114 slidably disposed in each of the grooves or slots 110. A plate 116 is secured to the core 106 such as by bolts 118 for the purpose of confining the bolts within the slots or grooves.

Each of the bolts 114 is provided with a longitudinal centrally disposed bore 120 extending from one end thereof, and a transverse bore or aperture 122 centrally disposed at one end of the bolt. Laterally projecting pins 124 carried by the core 106 project into the apertures 122 for the purpose of confining a spring 126 between a flatted portion thereof and the end of the bore 120. The bolts 114 are adapted to be moved or projected radially outwardly responsive to centrifugal force resulting from rotation of the core or driven member 106. The spring 126 disposed between the pin 124 carried by the core, and the end of the bore 120 in the bolt, is adapted to resist such outward movement of the bolt responsive to centrifugal force. The spring, however, is not strong enough to prevent the outward movement of the bolt after the speed of rotation of the driven member attains a predetermined rate.

Each of the bolts 106 are provided with a laterally projecting arm 130 having a beveled face 132. A hub 134 slidably splined on the driven shaft 22 and adapted to be moved by a fork 136 carried by the yoke rod 40, is provided with an internally beveled face 138 which is adapted to cooperate with the beveled face 132 on the arm 130. As illustrated in Fig. 2, the transmission is in neutral position so that there is no driving connection between the shafts 30 and 22. Movement of the hub 134 to the left, looking at Fig. 2, will telescope the hub over the arms 130, for the purpose of locking the bolts 114 against radial movement.

Each of the bores 112 is provided with a spring pressed poppet or detent which comprises a ball 140 adapted to be pressed into engagement with the side of a bolt 114 by a spring 142 backed by an adjustable plug 144. As clearly shown in Fig. 4, one of each of the poppets is in engagement with a notch 146 cut in one side of each of the bolts 114. This poppet has the effect of increasing the starting inertia of the bolt 114 in order to build up centrifugal force tending to move the bolts outwardly so that when the centrifugal force is sufficient to overcome the tension of the spring 126 and the thrust of the poppet engaging in the notch 146, the bolt will be snapped or moved quickly outwardly.

The oppositely disposed poppets are adapted to engage a notch 148 disposed on the opposite side of the bolt when the bolt is in its projected position for the purpose of holding the bolt in such position until the force of the spring 126 is sufficient to overcome centrifugal force, resulting from rotation of the core, and the thrust of the poppet engaging in the notch 148 when the bolt will be snapped to its retracted position in which it is shown in Fig. 4. When the driven shaft is connected to the driving shaft thru the intermediary of overrunning clutch 76 and gears 66, 48, 46 and 54, the driving member or shell 100, of the automatic speed changing mechanism, will be rotating at a rate of speed in excess of that of the driven member or core 106. Assuming that the driven shaft and core 106 carried thereby, are rotating at a rate of speed sufficient to move the bolts 114 outwardly, the bolts 114 will be prevented from moving outwardly. Altho all of the bolts will tend to move outwardly at approximately the same time, only one of the same may be projected outwardly at any one time into any one of the slots, 104, because of the relative spacing of the slots and the bolts. Each of the bolts 114 is provided with a beveled or tapered circumferential face 150 to enable the bolts to jump the slots when the driving member is rotating at a speed substantially in excess of that of the driven member. Since the width of the slot is only slightly in excess of that of the bolts, preferably several thousandths of an inch, the bolt 114 will have insufficient time to travel radially the distance represented by the difference between the high and low side of the bolt if the driving member is rotating at a speed substantially in excess of that of the driven member.

Whenever the speed of rotation of the driving member has been reduced relative to that of the driven member such as by closing of the engine throttle to reduce the speed thereof, the speed of the driving shaft and driving member will tend to decelerate to or approximately to the speed of rotation of the driven shaft and driven member. Whenever approximate synchronization between the speeds of rotation of the driving and driven member takes place, and assuming that the speed of rotation of the driven member is sufficient to move the bolts radially outwardly, one of the bolts 114 will drop into one of the slots 104 for the purpose of interlocking the driving and driven members of the automatic speed changing mechanism. Interlocking action will take place when one of the bolts 114 has had sufficient time to move radially outwardly, whenever one of the slots 104 is lined up with one of the grooves 110 so that the shoulder formed on the bolt adjacent the low point of the beveled surface thereof, will engage the edge or side of one of the fingers 102.

When this takes place, further deceleration of the speed of rotation of the driving member relative to that of the driven member, will cease and if the speed of the engine is accelerated, the driven shaft 22 will be driven in synchronism with the driving shaft thru the intermediary of member 100, one of the bolts 114, and the core 115, which is splined to the driven shaft 22. It will be remembered that prior to the operation of the automatic speed changing mechanism, the driven shaft was being driven thru the intermediary of gears 54, 46, 48, 66 and overrunning clutch 76. As soon as the automatic speed changing mechanism becomes operable directly to connect the shafts 30 and 22, the shaft 22 will overrun the driving member 78 of the overrunning clutch connected to the intermediate speed gear.

The force with which the poppets engage the notch 146 and the side of the bolts 114, may be varied to change the speed at which the centrifugal force resulting from rotation of the driven member 106, is sufficient to move the bolts outwardly. Further, the automatic change in the gear ratio from intermediate to a high gear ratio, cannot take place until the speed of rotation of the driving and driven members of the automatic speed changing mechanism, is approximately synchronized. This synchronization usually can be controlled by manipulation of the engine throttle so that the automatic shift from an intermediate to a high gear ratio can be made to take place at practically any desired speed above the predetermined or critical speed. The transmission will remain in automatic high gear ratio until the speed of rotation of the driven member falls below that sufficient to maintain the bolts in their outward or projected position.

It should be noted that the outward movement of the bolts shifts the center of gravity of the same away from the axis of rotation so that it will not take as high a speed of rotation of the driven member to hold the bolts in their outward position as it does to move them outwardly. Pressure of the poppet in the notch 148 in the side of the bolt serves to increase the differential between the speeds of rotation at which the bolt is movable outwardly and movable inwardly so that the poppet engaging the notches 148 may be adjusted for decreasing the speed at which the bolts are movable radially inwardly. The inwardly radial movement or collapse of the bolts will operate to disconnect the driving and driven members of the automatic speed changing mechanism and permit the driven shaft again to be driven thru the intermediary of gears 54, 46, 48, 66 and the overrunning clutch mechanism 76.

With the use of the automatic speed changing mechanism it will be impossible to get into a second or intermediate speed gear ratio from automatic high gear ratio until the speed of rotation of the driven shaft has fallen below that of a predetermined rate. Under some conditions it is desirable to change from a high gear ratio to an intermediate gear ratio even tho the vehicle may be proceeding at a relatively high rate of speed for intermediate gear. To that end I have provided manipulative means for effecting a forced shift from automatic high gear ratio to an intermediate gear ratio which operates to lock out the automatic speed changing mechanism. This manipulative means is also operable for locking out the automatic speed changing mechanism for the purpose of holding the transmission in an intermediate gear ratio before an automatic change in the gear ratio is effected. The gate 64 carrying the fork 136 which shifts the hub 134 upon the driven shaft, is disposed upon the yoke rod 40 so that the end of the shift lever 18 may only be moved into engagement with the gate 64 when the transmission is in automatic position.

Assuming the transmission to be in automatic high gear ratio, one of the bolts 114 will have been moved outwardly and will be projecting into one of the slots 104. Movement of the hub 134 to the left looking at Fig. 2 will cause beveled face 138 thereof to engage beveled face 132 of the laterally projecting arm 130 carried by a bolt 114 for the purpose of moving the bolt to its inward position. All of the bolts will then be locked in their inward position and will be unable to move radially outwardly for the purpose of engaging in the slot in the driving member of the automatic speed changing mechanism. The transmission will now be locked in an intermediate gear ratio, and will remain in that position until the hub 134 subsequently is moved to the right by the manipulation of the shift lever 18 back to automatic position. The hub 134 may be shifted to the left, looking at Fig. 2, for the purpose of changing from an automatic high gear ratio to a forced second gear ratio at any time and without regard to the speed of rotation of the driven shaft.

I claim:

1. A transmission having in combination a driving shaft, a driven shaft, means providing an intermediate speed fixed ratio driving connection between said shafts, an automatic clutch operable responsive to a predetermined speed of rotation of the driven shaft for connecting said driven shaft directly with said driving shaft and comprising a driving member, a driven member, and a centrifugally movable bolt carried by the driven member and adapted to be projected radially outwardly to engage a stop on said driving member for interconnecting said members, a slidable ring member carried on the driven shaft and cooperable with said bolt to move the same radially inwardly for breaking the direct driving connection between said shafts without regard to the speed of rotation of said driven shaft, and manipulative means for moving said ring member.

2. In a transmission, the combination with a driving shaft and a driven shaft, of means providing an initial fixed ratio driving connection between said shafts with an automatic clutch for drivingly connecting said shafts at a higher ratio than said initial driving connection including an annular member connected to said driving shaft and having a bolt-receiving recess in the periphery thereof, a radially movable bolt carried by the driven shaft and operated by centrifugal force to be moved radially into said recess when the speed of rotation of the driven shaft attains a predetermined rate, an engagement member on said bolt extending parallel with the axis of the driven shaft, and an axially movable cam ring member on said driven shaft for engagement with said engagement member to move said bolt out of said recess for breaking the driving connection between said shafts through said automatic clutch.

3. In a change speed mechanism, the combination of a driving shaft, a driven shaft, means providing an initial fixed ratio reduced driving connection between said shafts, an automatic clutch for directly connecting said shafts and comprising a driving member on the driving shaft, a fixed stop on said driving member, a driven member on the driven shaft, a radially movable bolt carried by said driven member and operable responsive to a predetermined speed of rotation thereof to engage said slots for interlocking said members, said bolt being provided with a cammed surface, a slidable cam ring carried by the driven shaft and adapted to engage the cammed surface of said bolt for moving the same to an inoperative position, and manually operative means for sliding said cam ring into engagement with the cammed surface of said bolt.

4. Transmission mechanism having in combination driving and driven shafts, a speed changing mechanism comprising a drum clutch member operatively associated with one of said shafts, and provided with a stop, a core clutch member nested within said drum and operatively associated with the other of said shafts, means including an overrunning clutch affording a one-way driving connection between said shafts whereby one of said clutch members will rotate at a rate different than that of the other of said clutch members, a centrifugally operable bolt carried by said core and movable, at any speed of said core above a predetermined rate, in one direction to engage said stop for interconnecting said clutch members thereby to provide a driving connection between said shafts around said overrunning clutch, means for detaining the operative engagement of said bolt with said stop until the speeds of said core and said drum are substantially synchronous, slidable means engageable with said bolt for holding the same out of operative engagement with said stop without regard to the speed of rotation of said clutch members, a two-way clutch associated with said one-way clutch operable for providing a two-way driving connection between said shafts whereby said clutch members will be rotated at relatively fixed different rates, and means for selectively shifting said slidable means to hold said bolt out of operative engagement with said stop for maintaining said one-way driving connection between said shafts, irrespective of the speed thereof; or said two-way clutch into operation whereby the speed of said clutch members cannot be synchronized.

REX E. KELLER.